United States Patent Office 2,809,120
Patented Oct. 8, 1957

2,809,120

CELLULOSE ESTER COMPOSITIONS

Arthur W. Sloan, Washington, D. C., and David J. Mann, Wharton, N. J., assignors to Atlantic Research Corporation, Alexandria, Va., a corporation of Virginia No Drawing. Application May 25, 1954,
Serial No. 432,323

31 Claims. (Cl. 106—181)

This invention relates to new and improved compositions comprising lower fatty acid esters of cellulose and plasticizers and processes for making said compositions.

For practical use, it is generally necessary to combine cellulose acetate or other lower fatty acid esters of cellulose with a plasticizer. It has been the practice hitherto to mix the cellulose ester with the plasticizer in a kneader or masticating mill to form a stiff paste or dough and then to extrude it under heat and pressure into the desired shape or to introduce the paste into a mold and subject the material to high temperatures and pressures. To prepare more fluid mixes, as, for example, for making coatings or films, it has been necessary to introduce considerable amounts of a volatile solvent or to form aqueous emulsions of the material. Since the volatile solvent and water must be removed, such a procedure is feasible for use only in the manufacture of thin films. Removal of the solvent also causes shrinkage of the film which in many cases is undesirable.

The object of this invention is to provide homogeneous fluid, pourable slurries of cellulose acetate or other lower fatty acid esters of cellulose in plasticizer which can be formed into films or coatings of substantially any desired thickness or molded into objects of any desired shape or size without requiring the removal of volatile solvents or other dispersion media or the application of high temperatures and pressures for molding.

Other objects and advantages of our invention will become obvious from the following detailed description.

We have discovered that cellulose acetate or other lower fatty acid cellulose esters can be dispersed or suspended in a plasticizer to form a fluid slurry, which is pourable, homogeneous and stable, when the cellulose ester particles possess certain essential characteristics. The particles must be small, spherical and non-porous. Particles having the desired characteristics and a process for making them are described in copending Sloan and Mann patent applications Serial Numbers 432,321 and 432,322, filed concurrently herewith, May 25, 1955. As disclosed in said co-pending applications, lower fatty acid cellulose esters having the requisite combination of characteristics can be prepared by dissolving the cellulose ester in an organic solvent comprising at least two components, one of the components being infinitely soluble in water and another being insoluble to moderately soluble in water, the mixed solvent having a water solubility of about 10 to 50% at 20° C. The resulting lacquer is dispersed in water in the presence of a colloiding agent and a water-soluble salt to form an oil-in-water emulsion. Solvent is removed from the dispersed lacquer particles by heating the emulsion or by diluting the emulsion with sufficient water to dissolve the solvent out of the particles, the dilution water containing dissolved salt. In the latter elution method, the least soluble solvent component must be moderately water-soluble. The following is a specific example of the process.

30 grams of cellulose acetate (acetyl value 37.2–37.8) were mixed with 200 ml. methyl acetate/methanol azeotrope (82:18) in a homogenizer until the lacquer was clear. A methyl cellulose (4000 cps.) solution was prepared by mixing 1.2 grams of the colloid with 125 ml. of boiling water and then cooling to 5–10° C. until the solution was clear. 1.6 grams of Turkey red oil (75% sulfonated castor oil) was then added to the methyl cellulose solution. The methyl cellulose solution was added to the cellulose acetate lacquer under vigorous agitation in the homogenizer. 4 grams of NaCl dissolved in 25 ml. water were added immediately after the methyl cellulose solution. The emulsion was agitated vigorously for about 5 minutes and then heated up to a final temperature of about 75° C. to distill off the methyl acetate/methanol solvent from the dispersed spherical particles. Vigorous agitation was maintained during distillation. The product was washed with water three times, filtered, washed again with water on the filter and dried. The product was in the form of spherical particles ranging in size from about 1 to 10 microns and having a density of 1.366 to 1.368.

Density of the particles is high. In the case of cellulose acetate, the average is about 1.3 to 1.38 with a minimum of about 1.25. This compares very favorably with published figures of 1.27 to 1.35. The average density of cellulose acetate propionate spheres prepared according to the above process ranges from about 1.195 to 1.29. In the case of cellulose acetate butyrate, the average density is about 1.193 to 1.197 as compared with published figures of 1.14 to 1.22 and a density of 0.546–0.647 for the raw materials from which the spheres were prepared. The density of cellulose acetate sorbate averages about 1.3 and is the same as the published density of 1.3. Thus the densities of the spherical particles prepared according to the above process clearly demonstrate the non-porosity of the particles.

The cellulose ester is preferably a lower fatty acid ester such as the acetate, propionate, butyrate and the like. The acylating groups may be the same or mixed. In general, we prefer to use cellulose acetate or a mixed cellulose ester containing the acetyl group and other lower fatty acid groups such as cellulose acetate propionate, cellulose acetate butyrate, cellulose acetate sorbate and the like.

As aforementioned, the particles must be spherical. This characteristic contributes both to fluidity of the mix and makes possible the incorporation of adequate amounts of the cellulose ester into the plasticizer without loss of fluidity. The sphericity of the particles permits them to move freely relative to each other and thus eliminates the matting and interlocking which, in the case of irregularly shaped particles, reduces fluidity and causes sedimentation. Sphericity, furthermore, makes possible the introduction of a maximum volume of the cellulose ester with a minimum surface area. The reduced surface area minimizes premature solvation of the cellulose ester by the plasticizer and thus is an additional factor in promoting fluidity.

Preferably the maximum average particle size is about 50 microns. In other words, the size distribution of the particles is desirably such that the maximum average by number is about 50 microns. Larger average sizes tend to form suspensions having a shorter shelf life than may be desirable for some purposes and also reduce somewhat the amount of cellulose ester which can be introduced into the plasticizer without loss of fluidity. Larger particles, as, for example, those ranging in size from about 50 to 100 microns can be dispersed in plasticizer to form fluid slurries which are stable, though of shorter shelf life than those formed by smaller particles, but cannot be introduced in quantities as large as those possible with the smaller particles unless some small particles are present which can slip into and fill the interstices between the larger particles. In general the maximum particle size which can be tolerated is about 100 microns. Above this size the particles tend to sediment and present curing problems since the plasticizer may not adequately penetrate to the core of the large particle. Particle sizes ranging up to about 10 to 25 microns in diameter are generally optimum for most purposes. Products comprising spheres which are 1 to 2 microns in diameter or less form somewhat more viscous dispersions than products containing larger particles since the former tend to solvate rather rapidly because of the relatively large surface area presented by the very finely comminuted particles. Although such dispersions are sufficiently fluid to pour, it is desirable to have some larger particles interspersed among the very fine particles.

It is also essential that the small, spherical particles be non-porous. Porous particles rapidly absorb the plasticizers to form wet powders.

The plasticizer may be any suitable non-volatile, high boiling solvent for the cellulose ester such as cellulose acetate. Such liquid plasticizers are well known in the art and include, for example, phthalates such as dimethyl phthalate, diethyl phthalate, dimethoxy ethyl phthalate, diethoxy ethyl phthalate, ethyl phthalyl ethyl glycollate and methyl phthalyl ethyl glycollate, acetates such as glyceryl triacetate, butylene glycol diacetate and cresyl glyceryl diacetate, citrates such as triethyl citrate and acetyl triethyl citrate, phosphates such as triphenyl phosphate, sulfonamides such as the N-ethyl o- and p-toluene sulfonamides, maleates such as methyl maleate, propionates such as diethylene glycol dipropionate, etc.

The particular plasticizer solvent used is determined by the particular properties desired in the finished plastic composition. For example, methyl phthalyl ethyl glycollate and ethyl phthalyl ethyl glycollate impart good moisture resistance properties. Such plasticizers as diethyl phthalate and dimethoxy ethyl phthalate are toughening agents. The phosphates provide fire-proofing qualities.

For the most part, the plasticizers dissolve the cellulose ester slowly at ordinary temperatures and rapidly at elevated temperatures. To some extent shelf life of the suspensions is determined by the solvent rate of the plasticizer at normal temperatures. The more readily the plastic is solvated at room temperature, the shorter is the shelf life. Where the slurry is to be employed within a relatively short time after preparation, this is of little moment. Where an extended shelf life as, for example, several days to weeks, is desired it is preferable to choose a plasticizer solvent having a very slow solution rate at normal temperatures.

Combinations of plasticizer solvents can be employed to produce a plastic having the combined properties imparted by the individual plasticizers as, for example, a mixture of plasticizers having toughening and fireproofing characteristics. Non-solvent plasticizers can also be used for their specific properties, such as increasing tensile strength and hardness. However, the non-solvent plasticizers should be used in combination with a solvent plasticizer.

The ratio of cellulose ester to plasticizer is determined largely by the use to which the plastic product is to be put and by the particular plasticizer employed. In general, the higher the ratio of cellulose ester to plasticizer, the tougher and harder the product. For most purposes the minimum practical ratio of cellulose ester to plasticizer is about 2 to 3 since smaller proportions of the cellulose ester may result in products which are too soft and some bleeding of plasticizer may occur. In some cases a ratio as low as 1 to 2 may be satisfactory. In general, the preferred minimum ratio of cellulose ester can be incorporated into the plasticizer. In general, the quantitative limit for the cellulose ester is set by the amount which the plasticizer can hold without loss of fluidity. This will vary with such factors as the particular plasticizer and average particle size and particle size distribution of the cellulose ester particles.

The cellulose ester plasticizer slurries are easily prepared by mixing the two components with sufficient agitation to produce a homogeneous mix. For the most part mixing is done at normal or room temperature and preferably at a temperature not exceeding about 35° C., although in the case of certain plasticizers the temperature may be as high as 50° C., to avoid excessive solvation of the cellulose ester and undue increase in viscosity. In some cases it may be desirable to cool the mix. The resulting mix is a homogeneous, fluid suspension of the small, spherical particles, which is stable, generally, for a period of several days to several weeks depending upon the particular plasticizer used and the size of the particles. We have found, also, that the presence of a small amount of a protective coating agent such as the colloid employed in making the particles according to the Sloan and Mann process previously referred to, reduces the solvation rate of the plasticizer at normal temperatures and produces somewhat more fluid slurries.

The fluid slurries are, normally, sufficiently fluid to pour rapidly. In some cases the viscosity of the mix may be such that pouring rate is somewhat slow and for manufacturing expediency it may be desirable to accelerate pouring by the application of slight pressures. However, even the more viscous slurries are sufficiently fluid to fill and conform to the shape of the mold without application of heat or pressure. To produce molded objects of any desired shape or size the slurries are poured into a suitable mold. They can be applied as coatings or films in any desired manner as by brushing, spraying or dipping. They can also be spread to form sheets of any desired thickness.

The cellulose ester plasticizer suspensions, after being introduced into molds or applied in the form of sheets or coatings, are cured by heating so that the cellulose ester substantially completely dissolves in the plasticizer solvent. The particular temperature employed is determined very largely by the particle size of the cellulose ester, the particular plasticizer and the desired rapidity of cure. The higher the temperature, the more rapid is the cure. It is, of course, desirable to avoid temperatures which are so high as to cause decomposition of the components.

The small size of the cellulose ester particles enhances rapidity of cure and, furthermore, ensures a homogeneous product in as much as the plasticizer can readily penetrate to the core of the small particles. In most cases, cure is obtained in a matter of minutes as, for example, about 5 to 10 minutes, at a temperature of about 150 to 160° C. Curing can be accomplished at lower temperatures but generally requires longer curing periods. For the most part, it is desirable to avoid temperatures above about 170 to 180° C. since some decomposition of the cellulose ester may occur.

Fillers and pigments of various kinds in finely divided form such as talc, carbon black, mica, sericite, zinc oxide, zinc sulfide, titanium dioxide, etc., can be introduced in substantial amounts into the cellulose ester plasticizer slurries without destroying fluidity. It is desirable that such fillers or pigments be in finely divided form.

Because of the homogeneous character of the cellulose ester plasticizer dispersions from which they are made, the cured products are also homogeneous and readily reproducible.

The cured products are tough and non-brittle and are suitable for the manufacture of sheets, coatings, tubing and molded objects for any purpose for which plasticized cellulose esters such as cellulose acetate has hitherto been employed in the art as, for example, in the manufacture of optical goods, toilet accessories, photographic film, toys, airplane and automotive parts, wrapping and packaging materials, tubing, coatings and lacquers, etc.

The fluid cellulose ester plasticizer slurries are highly advantageous in as much as they make unnecessary the addition of volatile solvents or other fluid media, such as water, which have hitherto been required to make the plasticized cellulose esters sufficiently fluid for such applications as coatings or films and which require the subsequent removal of the fluidifying media. Aside from the time and the cost of expensive solvents saved by our compositions, they eliminate the shrinkage which occurs when volatile solvents or water are removed. The cellulose ester-plasticizer slurries make possible the formation of coatings and sheets of any desired thickness since they pose no problem of solvent removal which has hitherto hampered the art. The fluid slurries also make possible the molding of objects of any desired shape or size without requiring preliminary kneading and masticating of the cellulose ester and plasticizer to form a stiff, dough-like paste or the application of high temperatures and pressures to press or mold the plasticized pastes or powders into a homogeneous mass of the desired shape. The use of volatile solvents or other liquid media to fluidify the plasticized mass where objects of any appreciable thickness are to be made is not feasible because of the difficulties encountered in removing such media from the interior portions of the pressed or molded objects.

Table I summarizes some examples illustrating the preparation of fluid homogeneous cellulose ester-plasticizer slurries according to our invention. The particles were spherical and non-porous. The slurries formed varied from highly fluid to somewhat viscous suspensions but in all cases were sufficiently fluid to pour.

| Cellulose ester | Particle size, microns | Plasticizer | Ratio Cellulose ester to plasticizer | Remarks |
| --- | --- | --- | --- | --- |
| Cellulose acetate | 1-12 | Ethyl phthalyl ethyl glycollate. | 1:1 | Cured at 155° C. in 12 min. Tensile strength—p. s. i. 1899.1. Elongation 26.3%. |
| Do | 1-12 | ----do---- | 1:1.5 | Cured at 150° C. in 10 min. Tensile strength—p. s. i. 1,009.5. |
| Do | 1-12 | ----do---- | 1:2 | Cured at 160° C. in 10 min. Tensile strength—p. s. i. 797.3. Elongation 14.3%. |
| Do | 1-4 | ----do---- | 1:1.5 | Cured at 160° C. in 10 min. Tensile strength—p. s. i. 1,080.7. Elongation 18%. |
| Do | 1-4 | ----do---- | 1:2 | Cured at 160° C. in 10 min. Tensile strength—p. s. i. 650.8. Elongation 7.2%. |
| Do | 1-12 | ----do---- | 1:1.5 | 60% KCl included in fluid slurry. Cured at 150° C. in 10 min. Tensile strength—p. s. i. 1,143.9. Elongation 5%. |
| Do | 1-4 | ----do---- | 1:1.5 | 60% KCl included in fluid slurry. Cured at 150° C. in 10 min. Tensile strength—p. s. i. 1,528.2. Elongation 5%. |
| Do | 1-10 | Diethyl phthalate | 1:1 | Cured at 110° C. in 7.25 hrs. |
| Do | 1-10 | Dibutyl phthalate | 1:1 | Cured at 150-5° C. in 5 min. |
| Do | 1-10 | Dioctyl phthalate | 1:1 | Do. |
| Do | 1-10 | Ethyl phthalyl ethyl glycollate | 1:1 | Cured at 110° C. in 7.25 hrs. |
| Do | 1-10 | Dimethyl phthalate | 1:1 | Cured at 110° C. in 0.66 hr. |
| Do | 1-10 | Dimethyl maleate | 1:1 | Do. |
| Do | 1-10 | Methyl phthalyl ethyl glycollate | 1:1 | Cured at 150-5° C. in 5 min. |
| Do | 1-12 | Diethyl phthalate | 1.09:1 | Cured at 150° C. in 10 min. Tensile strength—p. s. i. 1,898.5. |
| Do | 1-12 | ----do---- | 1:1.5 | Cured at 160° C. in 10 min. Tensile strength—p. s. i. 1,193.12. |
| Do | 1-12 | ----do---- | 1:2 | Cured at 160° C. in 10 min. Tensile strength—p. s. i. 809.71. |
| Do | 1-4 | ----do---- | 1.055:1 | Cured at 150° C. in 10 min. Tensile strength—p. s. i. 1852.9. Elongation 40%. |
| Do | 1-4 | ----do---- | 1:1 | 40% KCl included in fluid slurry. Cured at 150° C. in 10 min. Tensile strength—p. s. i. 1556.6. |
| Do | 1-4 | ----do---- | 1:1.25 | 50% KCl included in fluid slurry. Cured at 150° C. in 10 min. Tensile strength—p. s. i. 1600.2. |
| Do | 1-4 | ----do---- | 1:1.5 | 60% KCl included in fluid slurry. Cured at 150° C. in 10 min. Tensile strength—p. s. i. 1591.6. |
| Do | 15-25 | ----do---- | 1:1 | Cured at 155° C. in 5 min. |
| Do | 5-30 | ----do---- | 1:1 | Do. |
| Do | 3-25 | Dimethyl phthalate | 1:1 | Do. |
| Cellulose acetate sorbate | 1-10 | Diethyl phthalate | 1:1 | Do. |
| Cellulose acetate butyrate | 1-20 | ----do---- | 1:1 | Cured at 150° C. in 10 min. |
| Cellulose acetate propionate | 1-40 | ----do---- | 1:1 | Do. |

Although this invention has been described with reference to illustrative embodiments thereof, it will be apparent to those skilled in the art that it may be embodied in other forms but within the scope of the appended claims.

We claim:

1. A composition comprising a fluid, pourable, substantially homogeneous suspension of lower fatty acid ester of cellulose in a liquid vehicle consisting essentially of high boiling plasticizer solvent which dissolves the cellulose ester readily only at elevated temperatures, the cellulose ester being in the form of solid substantially spherical, substantially non-porous particles having a maximum diameter of about 100 microns, the minimum ratio of cellulose ester to plasticizer being about 1:2.

2. A composition comprising a fluid, pourable, substantially homogeneous suspension of lower fatty acid ester of cellulose in a liquid vehicle consisting essentially of high-boiling plasticizer solvent which dissolves the cellulose ester readily only at elevated temperatures, the cellulose ester being in the form of solid substantially spherical substantially non-porous particles having a maximum diameter of about 50 microns, the minimum ratio of cellulose ester to plasticizer being about 2:3.

3. A composition comprising a fluid, pourable, substantially homogeneous suspension of lower fatty acid ester of cellulose in a liquid vehicle consisting essentially of high-boiling plasticizer solvent which dissolves the cellulose ester readily only at elevated temperatures, the cellulose ester being in the form of solid substantially spherical, substantially non-porous particles having a maximum diameter of about 25 microns, the minimum ratio of cellulose ester to plasticizer being about 2:3.

4. The composition of claim 1 in which the cellulose ester is cellulose acetate, having a minimum density of about 1.25.

5. The composition of claim 2 in which the cellulose ester is cellulose acetate, having a minimum density of about 1.25.

6. The composition of claim 3 in which the cellulose ester is cellulose acetate, having a minimum density of about 1.25 and the minimum ratio of cellulose acetate to plasticizer is about 1:1.

7. The composition of claim 1 in which the minimum ratio of cellulose ester to plasticizer is about 2:3.

8. The composition of claim 2 in which the minimum ratio of cellulose ester to plasticizer is about 1:1.

9. A process for making plasticized lower fatty acid cellulose ester compositions which comprises mixing the cellulose ester in the form of solid substantially spherical, substantially non-porous particles having a maximum diameter of about 100 microns with a liquid vehicle consisting essentially of high-boiling plasticizer solvent which dissolves the cellulose ester readily only at elevated temperatures to form a fluid, pourable, substantially homogeneous suspension of the cellulose ester in said plasticizer, the minimum ratio of cellulose ester to plasticizer being about 2:3 and then heating the mixture to dissolve the cellulose ester in the plasticizer.

10. The process of claim 9 in which the maximum diameter of the cellulose ester particles is about 50 microns, the minimum ratio of cellulose ester to plasticizer being about 2:3.

11. The process of claim 9 in which the maximum diameter of the particles is about 25 microns, the minimum ratio of cellulose ester to plasticizer being about 2:3.

12. The process of claim 9 in which the cellulose ester is cellulose acetate, having a minimum density of about 1.25.

13. The process of claim 10 in which the cellulose ester is cellulose acetate, having a minimum density of about 1.25.

14. The process of claim 11 in which the cellulose ester is cellulose acetate.

15. A process for making plasticized lower fatty acid cellulose ester compositions which comprises mixing the cellulose ester in the form of solid substantially spherical, substantially non-porous particles having a maximum diameter of about 100 microns with a liquid vehicle consisting essentially of high-boiling plasticizer solvent which dissolves the cellulose ester readily only at elevated temperatures to form a fluid, pourable, substantially homogeneous suspension of the cellulose ester in said plasticizer, the minimum ratio of cellulose ester to plasticizer being about 2:3, spreading the fluid suspension into a sheet or film and then heating the suspension to dissolve the cellulose ester in the plasticizer.

16. A process for making plasticized lower fatty acid cellulose ester compositions which comprises mixing the cellulose ester in the form of solid substantially spherical, substantially non-porous particles having a maximum diameter of about 100 microns with a liquid vehicle consisting essentially of high-boiling plasticizer solvent which dissolves the cellulose ester readily only at elevated temperatures to form a fluid, pourable, substantially homogeneous suspension of the cellulose ester in said plasticizer, the minimum ratio of cellulose ester to plasticizer being about 2:3, pouring the fluid suspension into a mold, said suspension being sufficiently fluid to fill and conform to the shape of the mold, and then heating the suspension in the mold to dissolve the cellulose ester in the plasticizer.

17. The process of claim 9 in which the minimum ratio of cellulose ester to plasticizer is about 2:3.

18. The process of claim 9 in which the minimum ratio of cellulose ester to plasticizer is about 1:1.

19. The process of claim 9 in which the plasticizer is selected from the group consisting of dimethyl phthalate, diethyl phthalate and ethyl phthalyl ethyl glycollate.

20. The composition of claim 1 in which the plasticizer is selected from the group consisting of dimethyl phthalate, diethyl phthalate and ethyl phthalyl ethyl glycollate.

21. The composition of claim 2 in which the cellulose ester is cellulose acetate sorbate having a minimum density of about 1.3.

22. The composition of claim 21 in which the minimum ratio of cellulose acetate sorbate to plasticizer is about 1:1.

23. The composition of claim 2 in which the cellulose ester is cellulose acetate propionate having a minimum density of about 1.19.

24. The composition of claim 23 in which the minimum ratio of cellulose acetate propionate to plasticizer is about 1:1.

25. The composition of claim 2 in which the cellulose ester is cellulose acetate butyrate having a minimum density of about 1.19.

26. The composition of claim 25 in which the minimum ratio of cellulose acetate butyrate to plasticizer is about 1:1.

27. The process of claim 16 in which the minimum ratio of cellulose ester to plasticizer is about 1:1.

28. The process of claim 16 in which the maximum diameter of the cellulose ester particles is about 50 microns.

29. The process of claim 16 in which the maximum diameter of the cellulose ester particles is about 25 microns and the ratio of cellulose ester to plasticizer is about 1:1.

30. The process of claim 16 in which the cellulose ester is cellulose acetate having a minimum density of about 1.25.

31. The process of claim 27 in which the cellulose ester is cellulose acetate having a minimum density of about 1.25.

References Cited in the file of this patent

UNITED STATES PATENTS

| | | |
|---|---|---|
| 1,949,434 | Schneider | Mar. 6, 1934 |
| 2,389,940 | Speicher | Nov. 27, 1945 |
| 2,510,834 | Phillips | June 6, 1950 |
| 2,591,904 | Zola | Apr. 8, 1952 |
| 2,722,528 | Johnson | Nov. 1, 1955 |
| 2,740,723 | Voris | Apr. 3, 1956 |

FOREIGN PATENTS

| | | |
|---|---|---|
| 500,298 | Great Britain | Feb. 7, 1939 |
| 249,600 | Great Britain | Mar. 24, 1926 |
| 459,164 | Great Britain | Jan. 4, 1937 |

OTHER REFERENCES

Moelter et al.: "Ind. & Eng. Chem.," 41, 684–9 (1949).
Simonds and Ellis: "Handbook of Plastics" (1943), pages 260, 261 and 263.